US005509374A

United States Patent [19]

Trout

[11] Patent Number: 5,509,374
[45] Date of Patent: Apr. 23, 1996

[54] STRUCTURE MOTION MONITOR

[75] Inventor: John F. Trout, Aurora, Ill.

[73] Assignee: Lily Corporation, Aurora, Ill.

[21] Appl. No.: 290,154

[22] Filed: Aug. 15, 1994

[51] Int. Cl.$^6$ .............................. B43L 13/00; G01B 21/16
[52] U.S. Cl. .............................. 116/200; 116/203; 33/1 H
[58] Field of Search ..................................... 116/200, 203, 116/281, 283; 33/1 H; 73/786, 787, 792, 796, 799, 805

[56] References Cited

U.S. PATENT DOCUMENTS

| 3,842,509 | 10/1974 | Wyman et al. | 33/1 H |
| 4,068,613 | 1/1978 | Rubey | 116/203 |
| 4,472,883 | 9/1984 | Ortega | 33/1 H |
| 4,982,684 | 1/1991 | Rubey | 116/203 |

FOREIGN PATENT DOCUMENTS

| 142071 | 3/1961 | U.S.S.R. | 33/1 H |

*Primary Examiner*—William A. Cuchlinski, Jr.
*Assistant Examiner*—Willie Morris Worth
*Attorney, Agent, or Firm*—Baker & Daniels

[57] ABSTRACT

A monitoring device for indicating relative motion between first and second structural members. The motion monitoring device includes a first component with a base and a markable indicator member. The markable indicator is disposed on the top surface of the base, and the bottom surface of the base is fixedly mounted to the first structural member. The second component includes a base, a support arm and a marking indicator member. The second component base, which is fixedly mounted to the second structural member, is connected to one end of the support arm. The other end of the support arm is connected to the marking indicator member. The first component and the second component are operationally alignable upon mounting to the respective first and second structural members such that the markable indicator member and the marking indicator member achieve contact therebetween. When operationally aligned, movement of one of the structural members relative to the other structural member results in a mark being placed on the markable indicator member by the marking indicator member to record the relative movement.

10 Claims, 3 Drawing Sheets

STRUCTURE MOTION MONITOR

BACKGROUND OF THE INVENTION

This invention relates to motion monitors, and, in particular, to motion monitors used to measure the motion that one structural member experiences relative to another structural member.

For a variety of reasons, including both settlement and faulty construction materials, structures such as old or new buildings often develop cracks or faults in its structural members such as concrete walls or foundations. The portions of the structural members on opposite sides of the cracks experience shifting relative to one another. Besides breaking and shifting along cracks, a structural member may also shift or move relative to adjacent structural members along joint intersections therebetween. In order to monitor the size and motion of these joints and cracks to, for example, better predict potential damaging failure, various devices have been developed. For instance, electronic measurement devices have been employed. Overlaying grids have also been used in fault monitoring and measuring. In addition to potentially being expensive, these types of devices may also suffer from another shortcoming. In particular, while useful to determine at a given inspection time the relative positions of crack or joint separated structural members in comparison to a known control position, these devices do not indicate to an inspector how or along what path the crack separated structural member portions shifted in the process of the structural member portions achieving their present inspected positions.

Another application for motion monitoring devices affects construction or building related fields and relates to vibratory motion. Because the extent or intensity of cyclic, vibratory movement of one structural member relative to another structural member may, for example, implicate material fatigue concerns, proficient measurement of these movements is desirable to be achieved.

SUMMARY OF THE INVENTION

In one form thereof, the present invention provides a motion monitoring device for use with a first structural member and a second structural member to indicate relative motion therebetween and includes a first component and a second component. The first component includes a base means and a markable indicator member. The base means has a top surface and a bottom surface, and the markable indicator is disposed on the top surface. The bottom surface is fixedly mounted to the first structural member. The second component includes a base means, a support arm and a marking indicator member. The second component base means is fixedly mounted to the second structural member. The support arm at one end thereof is connected to the second component base means, and the support arm at the other end thereof is connected to the marking indicator member. The first component and the second component are operationally alignable upon mounting to the respective first and second structural members such that the markable indicator member and the marking indicator member achieve contact therebetween during the alignment, wherein movement of one of the structural members relative to the other structural member results in a mark being placed on the markable indicator member by the marking indicator member.

In another form thereof, the present invention provides a motion monitoring device for use in indicating the motion of a first structural member relative to a second structural member and includes a first component and a second component. The first component includes a base mountable on the first structural member and a markable indicator member connected to the first component base. The second component includes a base mountable on the second structural member and a marking indicator member connected to the second component base. At least one of the first component and second component includes an indicator member supporting arm which extends from the respective base and supports the respective indicator member. The indicator member supporting arm is structured and arranged to interconnect the first component and the second component such that the markable indicator member and the marking indicator member are located in an operational alignment. When the markable indicator member and the marking indicator member are disposed in this operational alignment, movement of one of the structural members relative to the other structural member results in a mark being placed on the markable indicator member by the marking indicator member.

An advantage of the motion monitoring device of the present invention is that it allows identification of movement between variously aligned structural members, including horizontal, vertical, and perpendicular members. Another advantage of the monitoring device of the present invention is that its capability to precisely record or document movement permits it to be utilized for a wide range of purposes, including monitoring of settlement of buildings, thermal movement at cracks and joints in structures, slab adjustments during jacking operations, and the behavior of structural members under loads. Another advantage of the monitoring device of the present advantage is its reusability. Still another advantage of the monitoring device of the present invention is that upon visual examination an inspector can not only determine where the two monitored structural members are positioned relative to a position where they were located at a previous inspection, but also where the structural members have been during the interim period. Another advantage of the present invention is that it is simple and easy to use and is low cost. Other advantages of the present invention will become apparent from the following description.

BRIEF DESCRIPTION OF THE DRAWINGS

Corresponding reference characters indicate corresponding parts throughout the several figures.

DESCRIPTION OF THE PREFERRED EMBODIMENT

The preferred embodiment illustrated in not intended to be exhaustive or to limit the invention to the precise form disclosed. The embodiment was chosen and described in order to best explain the principles of the invention and its application and practical use to thereby enable others skilled in the art to best utilize the invention.

Figure 1:
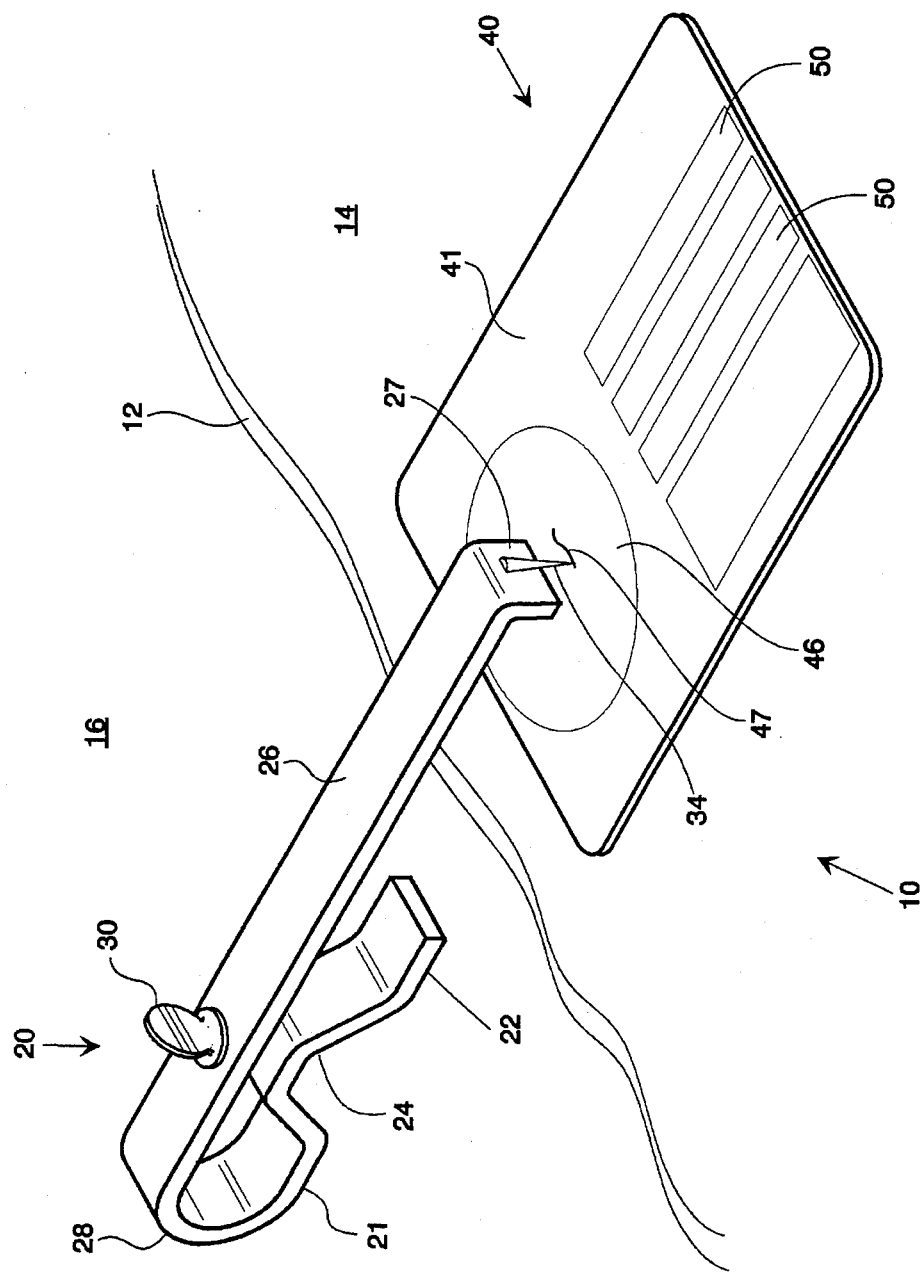
FIG. 1 is a perspective view of the motion monitoring device of the present invention operationally employed in conjunction with a cracked structural member.
Figure 2:
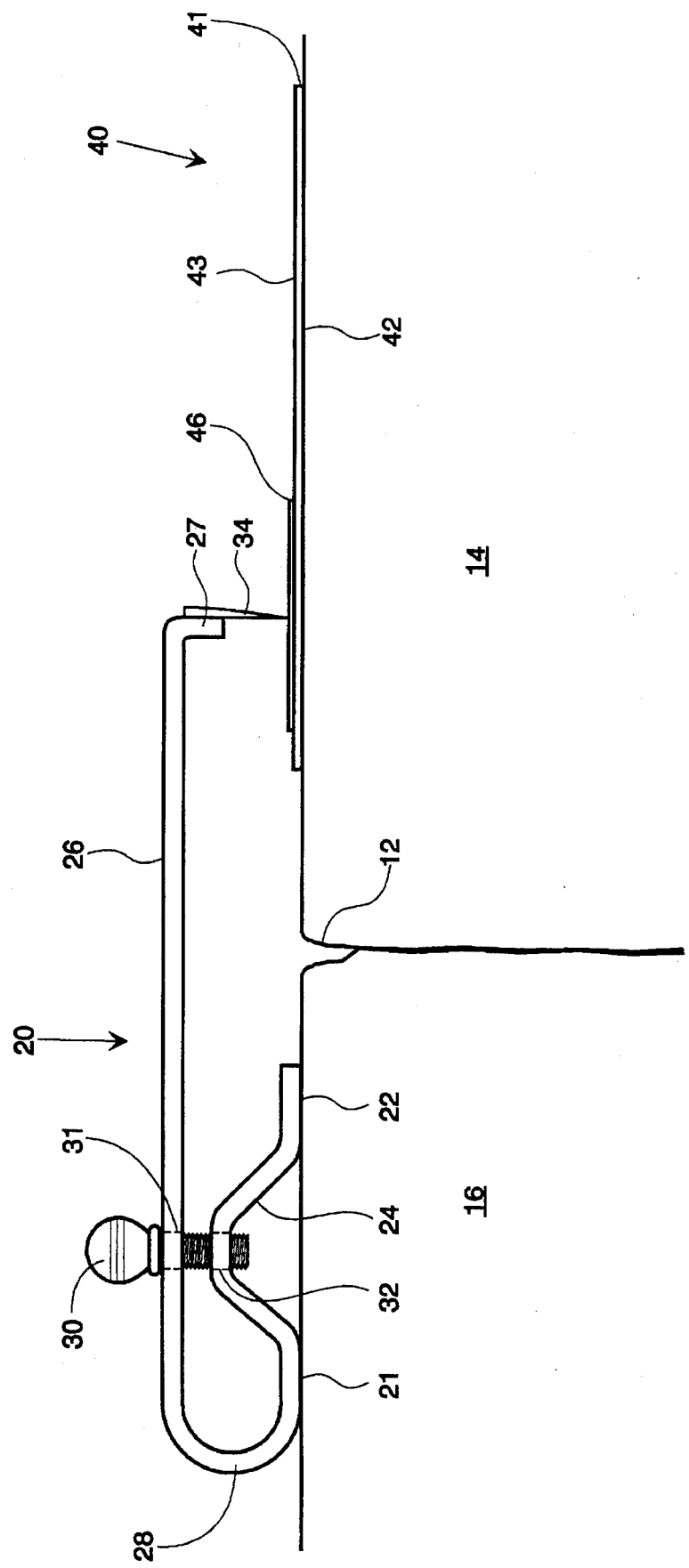
FIG. 2 is a side view of the motion monitoring device of FIG. 1.

Referring now to FIGS. 1 and 2, the preferred motion monitoring device of the present invention, generally designated 10, is shown operationally aligned over a crack 12 in a concrete slab, which was originally a monolithic structure and which may be part of a building foundation. Crack 12 serves as the separating border between the opposing portions or structural members 14, 16 of the concrete slab which have shifted relative to one another to cause the fault. Subject to slight variations in elevation resulting from the experienced shifting, structural members 14 and 16 are substantially coplanar and horizontally aligned. Alternatively, the structural members could be vertically or otherwise aligned. While illustrated and further described herein in the monitoring of structural members related to buildings and the like, it is believed that this particular embodiment is merely illustrative of one type of beneficial application of the present invention. The motion monitoring feature of the present invention is envisioned finding useful application with other structures and their respective structural members, for instance sidewalks, roads, and bridges, includes vibrating machinery and their fixed bases.

Motion monitor 10 essentially comprises two components, namely a marking component, generally designated 20, and a cooperating markable component, generally designated 40. Marking component 20 is primarily and preferably formed from a single piece of rigid, rugged, heat treated stainless spring steel, which in operation will accurately reflect motion without distortion due to flexing. Marking component 20 includes mounting pads or feet 21, 22, an adjustment projection 24, an extended and cantilevered support arm 26, and a substantially C-shaped spring segment 28 linking the proximate end of support arm 26 with mounting pad 21. In the preferred embodiment, mounting pads 21, 22 serve as the marking component base. As used herein, base broadly refers to those portions of each motion monitor component which for operation are fixedly mounted or attached, i.e. mounted so as not to move relative thereto, to the various structural members 14, 16.

To facilitate operational assembly, thumb screw 30 is provided in order to adjust and maintain the angular orientation of support arm 26 relative to mounting pads 21, 22 and therefore to structural member 16. The threaded stem of thumb screw 30 extends through an aperture 31 passing through support arm 26 and engages a threaded bore 32 in the upper raised portion of adjustment projection 24, which protrudes from mounting pads 21, 22 toward support arm 26.

The distal end of support arm 26 is formed with a downwardly extending flange 27 to which is attached scriber 34, preferably by way of soldering. Scriber 34, which is the preferred marking indicator member, is constructed from corrosion resistant stainless steel and is fixedly connected by way of support arm 26 and spring segment 28 to the base pads 21, 22. During operation, the sharp point at the lower end of scriber 34 is the tool piece which actually marks the markable indicator member described more fully below.

Markable component 40 includes a base plate 41, which is preferably a credit card sized and shaped piece of black plastic and which includes a flat bottom surface 42 and a flat top surface 43. Located on top surface 43 in a circular target shape is a thin film coating 46, which serves as the markable indicator member. The thickness of coating 46 is enlarged in FIGS. 2 and 3 for purposes of illustration. This composition allows a mark 47 (see FIG. 1) to be scratched or scraped off upon contact with scriber 34, but resists excessive chipping or flaking which might obscure the actual points of contact with scriber 34. The white color of target coating 46 contrasts with the black color of top surface 43 to allow easier reading of the limits of mark 47.

Also preferably provided on top surface 43 are a number of notation sections 50, which are fabricated to be written on with a common writing instrument such as a pen or pencil. Notation sections 50 allow a user to record directly on markable component 40 such pertinent data as the inspector, date, location, etc.

The construction of motion monitor 10 will be more fully understood after a description of its operation. To monitor the motion of, for example, a cracked structure as shown in FIG. 1, the motion monitor components 20, 40 are mounted to opposite structural members 14, 16 and spanning crack 12 as shown in FIGS. 1 and 2 and in the following manner. For best results, in addition to being clean, sound, dry, and frost-free, the surfaces of structural members 14, 16 to which motion monitor 10 is mounted should be prepared by the removal of loose particulate material with a hand wire brush. Markable component 40 should be installed first with the target coating 46, i.e. the markable indicator member, generally adjacent crack 12. If the surface of one of the structural members 14, 16 is lower than the surface of the other, markable component 40 should be installed on that lower surface. Although other mounting techniques, provided sufficiently motion restricting, are permissible, the monitor components are preferably fixedly connected to the structural members with adhesives. After a generous strip of cyanoacrylate glue or similar adhesive is applied in a circular pattern to base plate bottom surface 42 immediately opposite target coating 46, as well as a portion of adhesive at each base plate corner, base plate 41 is pressed down against structural member 14 and held tightly thereat for approximately five seconds for bonding purposes.

Marking component 20 is then fixedly mounted to structural member 16 in the following manner. After unscrewing thumb screw 30 such that support arm 26 raises under the biasing force of spring segment 28 sufficiently upward to cause the lower point of scriber 34 to be above the plane of the underside of pads 21, 22, a generous portion of the above mentioned glue adhesive is applied to the underside of both mounting pads 21, 22. Then, while being held above structural member 16, markable component 20 is first oriented such that the lower point of scriber 34 is positioned directly above the center of target coating 46, and then pressed downward such that the adhesive coated pads 21, 22 contact member 16. After allowing several seconds for the adhesive to set, thumb screw 30 is carefully turned clockwise until the lower point of scriber 34 just touches or contacts target coating 46. Then, thumb screw in turned clockwise an additional amount, such as about one-eighth turn, to slightly lower scriber 34 further to ensure a complete initial penetration or contact with coating 46. When this is completed, motion monitor 10 is ready for operation as scriber 34 is in an operational alignment with coating 46.

It will be appreciated that when so configured, support arm 26 spans fault 12 and provides the operational interconnection of marking component 20 with markable component 40. The movement or motion of structural member 16 relative to structural member 14 will be indicated as a mark 47 scratched into coating 46 by scriber 34. Consequently, because the relative movement is indicated by a thin scratch 47 which is a permanent, indelible record of that movement, one can determine upon visual examination where, relative to one another, structural members 14 and 16 presently are as well as where they have been located. The extent of the movement, from as little as about 0.005 inch to as large as the radius of target coating 46, can be measured by using, for example, calipers to physically measure the length of mark 47.

Figure 3:
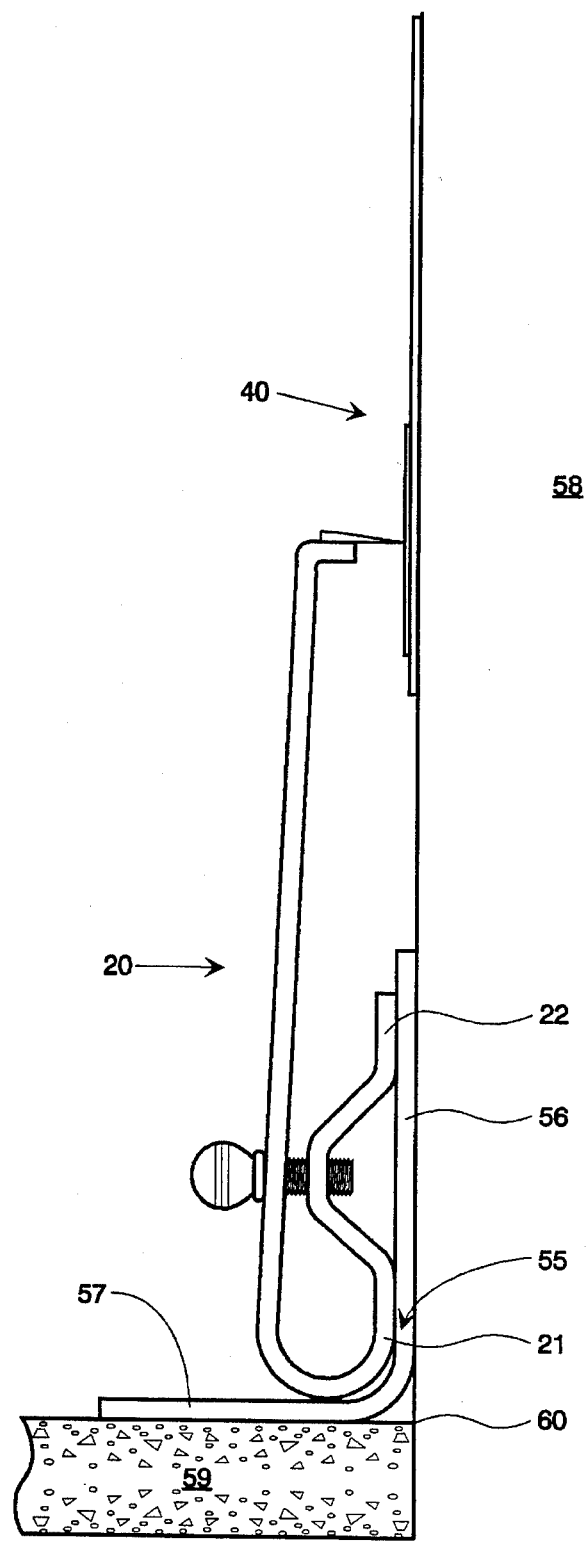
FIG. 3 is a side view of the motion monitoring device of FIG. 1 being used with an additional mounting bracket to monitor motion between two perpendicularly disposed structural members.

In addition to monitoring motion of two structural members which are substantially coplanar or parallel, the present invention can also be readily adapted to be utilized in conjunction with structural members positioned in other orientations, such as perpendicular. For example, as shown in FIG. 3, the motion monitor of FIG. 1 is shown with an additional mounting bracket, generally designated 55, and in use with perpendicularly disposed structural members, namely wall 58 and floor 59 which intersect along joint 60. Mounting bracket 55, which is substantially L-shaped with an upper leg 56 and a lower leg 57, conforms to the shape of marking component 20. To operationally employ motion monitor 10, the manner of assembly is conceptually similar to that described above, except that the position of markable component 40 along the height of wall 58 above floor 59 is dictated by the height of marking component 20 which results when it is positioned as shown in FIG. 3. In addition, instead of fixedly connecting mounting pads 21, 22 to the structural member surface, pads 21, 22 are adhesively connected to the inner surface of bracket upper leg 56. The outer surface of bracket lower leg 57 is then adhesively connected to floor 59 such that scriber 34 and target coating 46, after adjustment of thumb screw 30, are properly operationally aligned.

Alternate designs of the marking and markable components will also be recognized by those of skill in the art as falling within the scope of the invention. For instance, for perpendicularly disposed structural members, mounting bracket 55 could be eliminated if scriber 34, rather than projecting downward and perpendicular to support arm 26 as shown, extended laterally or in axial alignment with support arm 26.

After motion monitor 10 has served its function, monitor markable component 40 can be removed by inserting a spatula or glazing knife blade between bottom surface 42 and the mounted structural member. Monitor marking component 20 can be removed by breaking it loose with a lateral force. It will be appreciated that monitor marking component 20 may be reused since steel scriber 34 is not dulled by either coating 46 or the plastic base plate 41.

While this invention has been described as having a preferred design, the present invention may be further modified within the spirit and scope of this disclosure and the appended claims. For example, instead of being located directly on top surface 43 of base plate 41, markable indicator member 46 could be mounted on an extending support arm, similar in concept to arm 26. Instead of extending directly upward, this support arm may even interconnect with arm 26 at a location directly above or proximate crack 12. In addition, the positions of the marking and markable indicator members could be reversed, whereby scribe 34 would be mounted on plate 41 and markable indicator member 46 would be supported by cantilevered support arm 26. Rather than the scriber/scratchable coating embodiment disclosed, other types of cooperating marking devices could be substituted. Instead of providing vertical adjustment of scriber 34 indirectly by means of altering support arm 26, scriber 34 or an alternate marking or markable indicator member could be directly adjustable relative to an otherwise fixed support arm 26. Furthermore, adjustment projection 24 need not interrupt the base of marking component 20 into two small pads 21,22, but instead could be formed above a single continuous base pad. This application is therefore intended to cover any variations, uses, or adaptations of the invention using its general principles. Further, this application is intended to cover such departures from the present disclosure as come within known or customary practice in the art to which this invention pertains.

What is claimed is:

1. For use with a first structural member and a second structural member to indicate relative motion therebetween, a motion monitoring device comprising:

a first component including a base and a markable indicator member; said base having a top surface and a bottom surface; said markable indicator member disposed on said top surface; said bottom surface being fixedly mountable to the first structural member;

a second component including a base, a support arm and a marking indicator member; said support arm having two ends, said second component base being fixedly mountable to the second structural member; said support arm at one end thereof being connected to said second component base; and said support arm at a second end thereof being connected to said marking indicator member; and said first component and said second component being operationally alignable upon mounting to said respective first and second structural members such that said markable indicator member and said marking indicator member achieve contact therebetween during mounting—wherein movement of one of the structural members relative to the other structural member results in a mark being placed on the markable indicator member by the marking indicator member.

2. The motion monitoring device of claim 1 wherein said support arm is disposed at an angular orientation relative to said second component base; and wherein said second component further comprises means for adjusting said angular orientation.

3. The motion monitoring device of claim 1 wherein said markable indicator member comprises a scratch susceptible coating on at least a portion of said top surface; said second component marking indicator member includes a scriber, whereby said coating is scratched off by said scriber during operation to form said mark.

4. The motion monitoring device of claim 1 wherein the first and second structural members are substantially perpendicularly disposed; said motion monitoring device further comprising a substantially L-shaped mounting bracket; said second component base means being mounted on said bracket with said bracket being mounted on the second structural member.

5. A motion monitoring device for use in indicating the motion of a first structural member relative to a second structural member comprising:

a first component including a base mountable on the first structural member and a markable indicator member connected to said first component base, a second component including a base mountable on the second structural member and a marking indicator member connected to said second component base, at least one of said first component and said second component including an indicator member supporting arm extending from the respective base thereof and supporting the respective indicator member, said markable indicator member and said marking indicator member being located in an operational alignment, and whereby movement of one of the structural members relative to the other structural member when said markable indicator member and said marking indicator member are disposed in said operational alignment with said first and second components being mounted respectively to said structural members results in a mark being placed on said markable indicator member by said marking indicator member.

6. The motion monitoring device of claim 5 wherein said second component includes said indicator member supporting arm, said indicator member supporting arm being disposed at an angular orientation relative to said second component base, and said second component further including means for adjusting said angular orientation.

7. The motion monitoring device of claim 6 wherein said adjusting means comprises a thumb screw extending through an aperture in said indicator member supporting arm and threadably engaging said second component base.

8. The motion monitoring device of claim 5 wherein said second component marking indicator member is a scriber, said first component base having a surface, said markable indicator member comprising a scratch susceptible coating on said surface, said coating being scratched off by said scriber during operation to form said mark.

9. The motion monitoring device of claim 8 wherein said scriber comprises stainless steel.

10. The motion monitoring device of claim 5 wherein the first structural member and the second structural member are substantially perpendicularly disposed, said motion monitoring device further comprising a substantially L-shaped mounting bracket, said second component base being mounted on said bracket, and said bracket being mounted on the second structural member.

* * * * *